United States Patent Office.

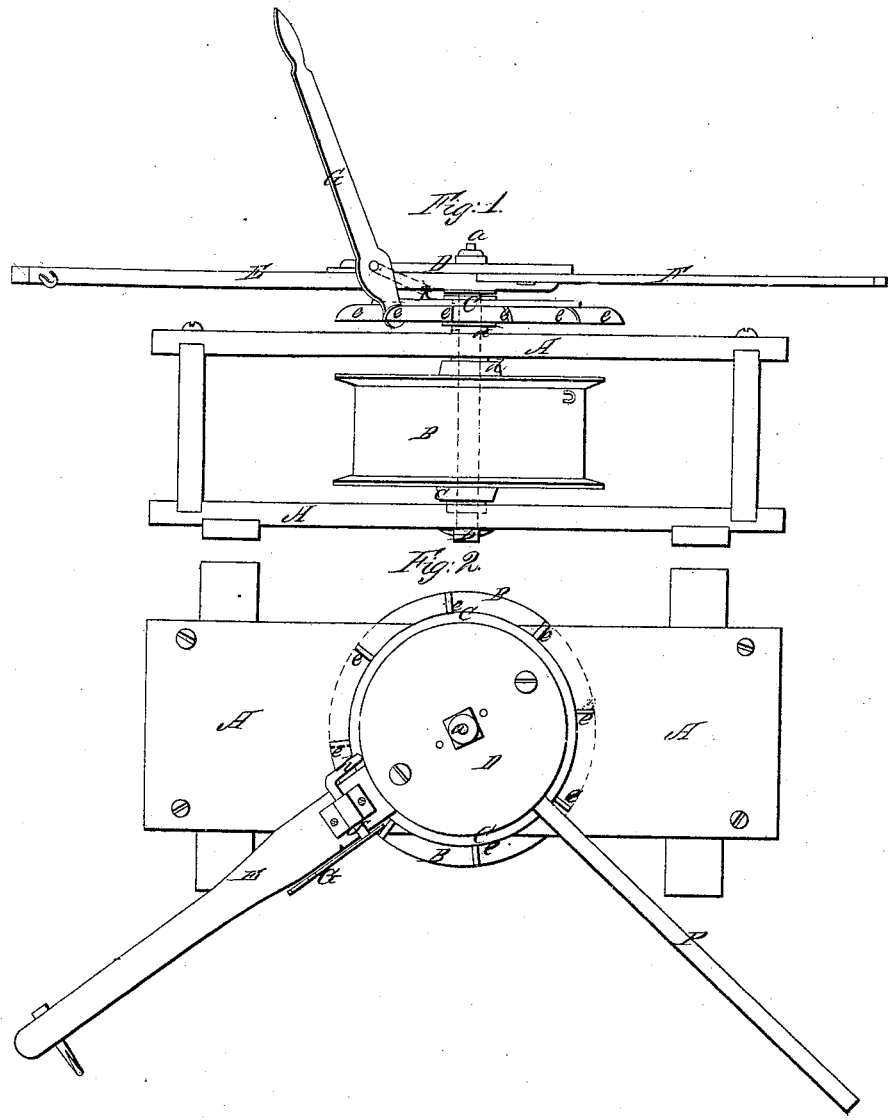

J. S. PARK, OF MONTONDON, PENNSYLVANIA.

Letters Patent No. 92,088, dated June 29, 1869.

IMPROVEMENT IN HOISTING-MACHINES.

The Schedule referred to in these Letters Patent and making part of the same.

*To all whom it may concern:*

Be it known that I, J. S. PARK, of Montondon, in the county of Northumberland, and in the State of Pennsylvania, have invented certain new and useful Improvements in Hoisting-Apparatus; and do hereby declare that the following is a full, clear, and exact description thereof, reference being had to the accompanying drawings, and to the letters of reference marked thereon.

The nature of my invention consists in the construction and general arrangement of a "hoisting-apparatus," as will be hereinafter fully set forth.

In order to enable others skilled in the art to which my invention appertains, to make and use the same, I will now proceed to describe its construction and operation, referring to the annexed drawings, which form a part of this specification, and in which—

Figure 1 is a side elevation, and

Figure 2, a plan view of my machine.

A represents a frame, of any suitable construction, in the centre of which is placed a vertical shaft, $a$, which passes through the frame, and is at its lower end provided with a circular disk or projection, which rests on a bar, $b$, under the frame A.

Around the shaft $a$, inside of the frame, is placed a spool, B, to which the hoisting-rope is attached.

The spool B is, on its under side, provided with a collar, $c$, which extends downwards, around the shaft $a$, into an enlargement of the hole in the frame through which the shaft passes. This collar thus forms the support and lower bearing for the spool B.

The spool is on its upper side provided with another collar, $d$, which extends upward around the shaft $a$, through the frame A, and is, above said frame, provided with a wheel, C, which has on its under side a series of ribs, $e$ $e$, radiating from the centre and extending beyond the outer periphery of the wheel.

The upper end of the shaft $a$ is, above the wheel C, provided with a cap or wheel, D, from which the arm or lever E extends, the horse being attached or hitched to the outer end of said lever.

Another arm or lever, F, also extends from the cap D, to which the horse's head is attached, as usual in such machines.

It will be seen that if the horse is started, the cap D and shaft $a$ are turned, but not the spool B.

So as to turn this spool whenever desired, I provide the arm E with a lever, G, the lower end of which extends below said arm, and when moved inwards the lower end catches on the projecting end of the rib $e$, and turns the wheel C and the spool B, winding up the rope on said spool.

As soon as it is desired to unwind the rope from the spool, it is only necessary to turn the lever G, so that its lower end becomes released from the rib $e$, and the horse may continue its movement without interfering.

Sometimes it would naturally happen that the rope would be unwound too fast, and to prevent this occurrence I provide the lever G, with an arm, $f$, which extends across the arm E, and by means of which the lever is provided to said arm E.

The arm or rod $f$ has at its outer end a brake, $h$, so arranged that when the lever G is thrown in gear with any one of the ribs $e$, said brake will be raised up; but when the lever is thrown out of gear with the ribs, then the brake will bear against the wheel C, which, for this purpose, is made of metal, and by this means the spool B is prevented from turning too fast.

Having thus fully described my invention,

What I claim as new, and desire to secure by Letters Patent, is—

1. The spool B, provided with collars $c$ and $d$, and wheel C, having ribs $e$ $e$, all substantially as shown and described.

2. The combination of the lever G, arm $f$, brake $h$, and arm E, all substantially as and for the purposes set forth.

3. In combination with the spool B, and wheel C, with its ribs $e$ $e$, the shaft $a$, wheel D, arm E, lever G, and brake $h$, all constructed and arranged to operate substantially as and for the purposes herein set forth.

In testimony that I claim the foregoing, I have hereunto set my hand, this 5th day of March, 1869.

J. S. PARK.

Witnesses:
 LEOPOLD EVERT,
 CORNELIUS COX.